US011361922B2

(12) United States Patent
Tanigaki et al.

(10) Patent No.: US 11,361,922 B2
(45) Date of Patent: Jun. 14, 2022

(54) BREAKER

(71) Applicant: Mitsubishi Electric Corporation, Tokyo (JP)

(72) Inventors: Shuichi Tanigaki, Tokyo (JP); Satoru Maeno, Tokyo (JP); Daisuke Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 165 days.

(21) Appl. No.: 16/964,670

(22) PCT Filed: Feb. 9, 2018

(86) PCT No.: PCT/JP2018/004678
§ 371 (c)(1),
(2) Date: Jul. 24, 2020

(87) PCT Pub. No.: WO2019/155626
PCT Pub. Date: Aug. 15, 2019

(65) Prior Publication Data
US 2021/0057177 A1    Feb. 25, 2021

(51) Int. Cl.
*H01H 3/22* (2006.01)
*H01H 33/40* (2006.01)
*H01H 33/42* (2006.01)
*H02B 13/035* (2006.01)

(52) U.S. Cl.
CPC .............. *H01H 33/40* (2013.01); *H01H 3/22* (2013.01); *H01H 33/42* (2013.01); *H02B 13/035* (2013.01)

(58) Field of Classification Search
CPC .......... H01H 3/22; H01H 3/3042; H01H 3/28; H01H 3/38; H01H 33/40; H01H 33/42; H02B 13/035; H02B 13/055

USPC ........ 200/400, 17 R; 218/13, 14, 55, 57, 59, 218/60, 68, 79, 80, 97
See application file for complete search history.

(56) References Cited

U.S. PATENT DOCUMENTS

| 4,839,476 A | 6/1989 | Okuno |
| 5,448,030 A * | 9/1995 | Yamamoto ............. H01H 33/40 218/84 |

(Continued)

FOREIGN PATENT DOCUMENTS

| JP | S58224507 A | 12/1983 |
| JP | S63020337 U | 2/1988 |

(Continued)

OTHER PUBLICATIONS

International Search Report (PCT/ISA/210), with translation, and Written Opinion (PCT/ISA/237) dated Apr. 24, 2018, by the Japan Patent Office as the International Searching Authority for International Application No. PCT/JP2018/004678.

*Primary Examiner* — William A Bolton
(74) *Attorney, Agent, or Firm* — Buchanan Ingersoll & Rooney PC

(57) ABSTRACT

A breaker includes a tank, first to third fixed contacts provided inside the tank, first to third movable contacts that are provided inside the tank and are movable, and first to third operation devices provided outside the tank to move the first to third movable, respectively. The first to third operation devices respectively include first to third torsion bars serving as a driving source to move the first to third movable contacts, respectively.

6 Claims, 6 Drawing Sheets

(56) References Cited

U.S. PATENT DOCUMENTS

| | | | | |
|---|---|---|---|---|
| 6,232,569 | B1 * | 5/2001 | Nakajima | H01H 3/3042 |
| | | | | 200/17 R |
| 6,444,934 | B1 * | 9/2002 | Imura | H01H 3/3042 |
| | | | | 200/17 R |
| 7,796,374 | B2 * | 9/2010 | Mori | H01H 33/42 |
| | | | | 218/120 |
| 8,207,804 | B2 * | 6/2012 | Ohtsuka | H01H 3/30 |
| | | | | 200/17 R |
| 9,431,185 | B2 * | 8/2016 | Tanigaki | H01H 3/28 |

FOREIGN PATENT DOCUMENTS

| | | | |
|---|---|---|---|
| JP | S63304542 | A | 12/1988 |
| JP | H10321088 | A | 12/1998 |
| JP | 2003016882 | A | 1/2003 |

\* cited by examiner

BREAKER

FIELD

The present invention relates to a breaker that opens/closes a contact by using energy stored by twisting a torsion bar.

BACKGROUND

A breaker included in a gas-insulated switchgear is constituted by a fixed contact and a movable contact that are provided inside a tank filled with insulating gas. The movable contact is supposed to be movable between a position to come into contact with the fixed contact and a position to come out of contact with the fixed contact. The breaker is provided with an operation device that operates the movable contact to switch between contact with the fixed contact and separation from the fixed contact in order to power on and power off the power supply. The operation device is provided outside the tank. As the operation device, there is a three-phase simultaneous operation device that operates movable contacts for three phases simultaneously. As the three-phase simultaneous operation device, a torsion-bar type operation device is used in some cases as disclosed in Patent Literature 1. The torsion-bar type operation device operates a movable contact by using energy stored by twisting a torsion bar as a driving force.

CITATION LIST

Patent Literature

Japanese Patent Application Laid-open No. S63-304542

SUMMARY

Technical Problem

However, the torsion bar tends to become long because the torsion bar needs to store a sufficient amount of energy to simultaneously operate the three-phase movable contacts. For this reason, it is necessary to secure a space for the long torsion bar provided outside the tank, and this may decrease the design flexibility for the gas-insulated switchgear.

The present invention has been achieved to solve the above problems, and an object of the present invention is to provide a breaker including a torsion-bar type operation device that can increase design flexibility.

Solution to Problem

In order to solve the above problems and achieve the object, the present invention includes: a tank; first to third fixed contacts provided inside the tank; first to third movable contacts that are provided inside the tank and are movable; and first to third operation devices provided outside the tank to move the first to third movable contacts, respectively. The first operation device includes: a first main body having a first interlocking portion that is inserted into the tank and connected with the first movable contact and moves in conjunction with the first movable contact; and a first torsion bar having a rod shape extending from the first main body, and serving as a driving source to move the first interlocking portion and thus to move the first movable contact. The second operation device includes: a second main body having a second interlocking portion that is inserted into the tank and connected with the second movable contact and moves in conjunction with the second movable contact; and a second torsion bar having a rod shape extending from the second main body, and serving as a driving source to move the second interlocking portion and thus to move the second movable contact. The third operation device includes: a third main body having a third interlocking portion that is inserted into the tank and connected with the third movable contact and moves in conjunction with the third movable contact; and a third torsion bar having a rod shape extending from the third main body, and serving as a driving source to move the third interlocking portion and thus to move the third movable contact.

Advantageous Effects of Invention

According to the present invention, there is an effect where it is possible to provide a breaker including a torsion-bar type operation device that can increase design flexibility.

DESCRIPTION OF EMBODIMENTS

A breaker according to an embodiment of the present invention will be described in detail below with reference to the accompanying drawings. The present invention is not limited to the embodiment.

Embodiment

Figure 1:
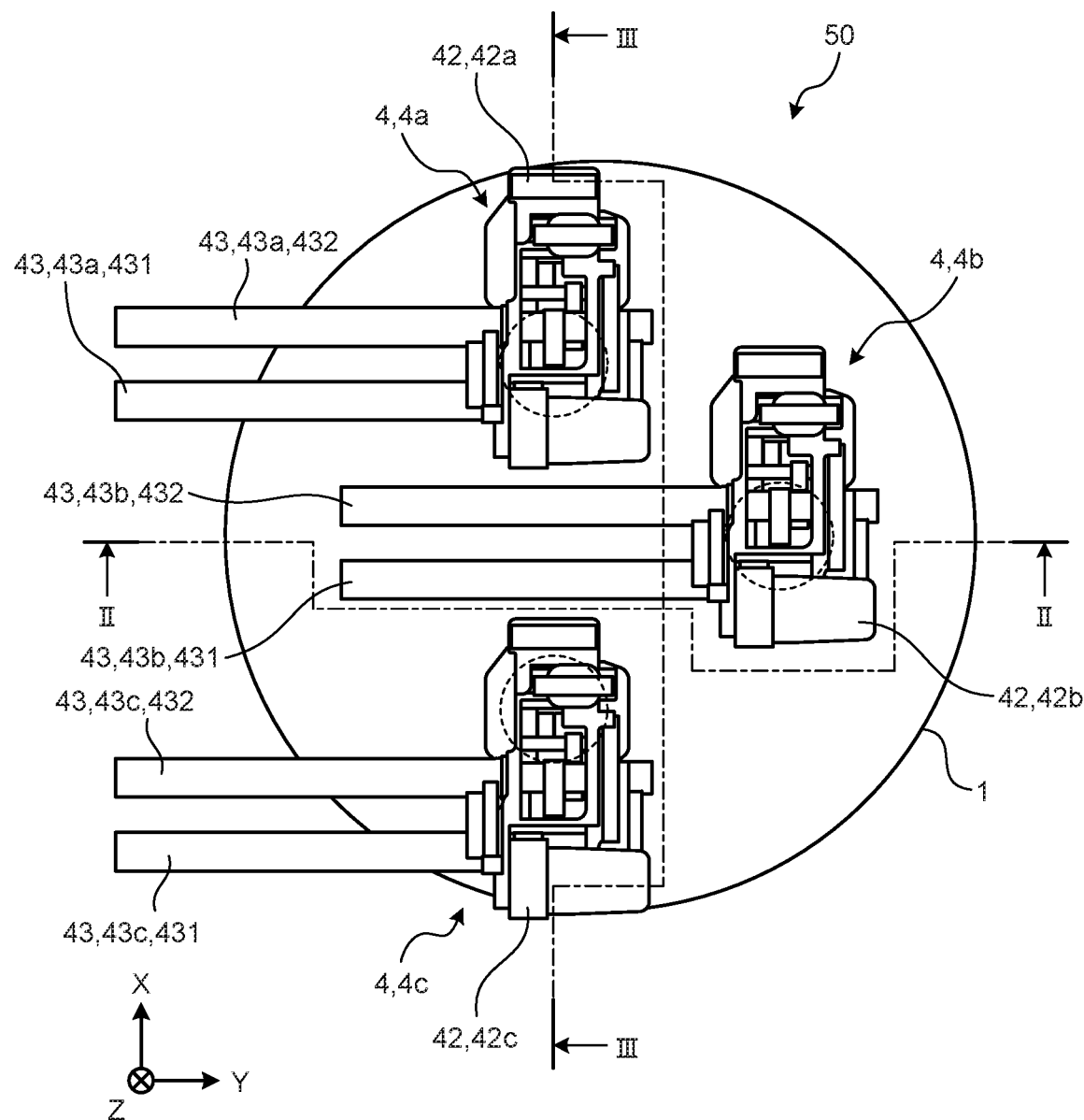
FIG. 1 is a plan view of a breaker according to an embodiment of the present invention.
Figure 2:
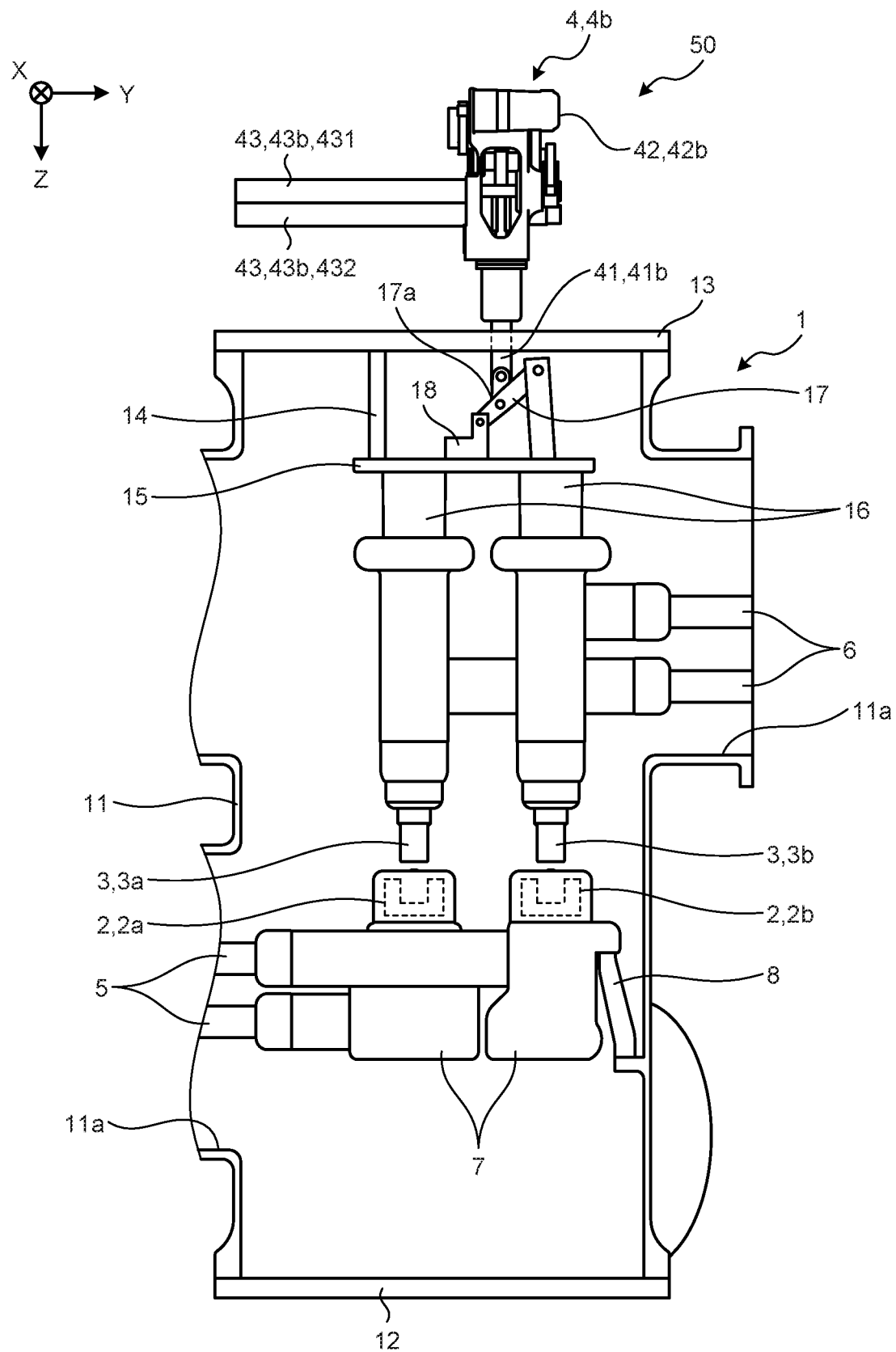
FIG. 2 is a cross-sectional diagram taken along the line II-II illustrated in FIG. 1.
Figure 3:
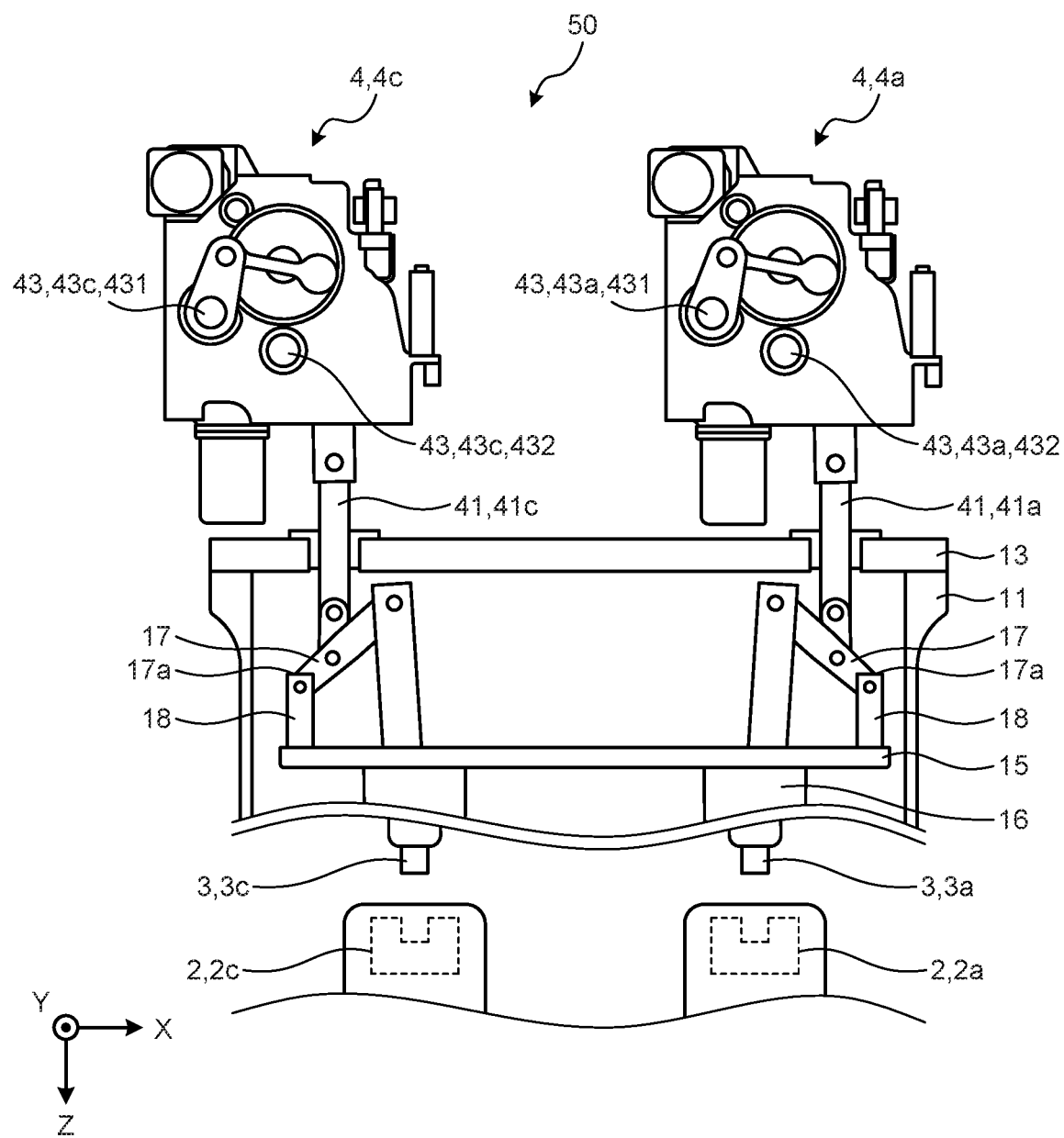
FIG. 3 is a cross-sectional diagram taken along the line III-III illustrated in FIG. 1.

FIG. 1 is a plan view of a breaker according to an embodiment of the present invention. FIG. 2 is a cross-sectional diagram taken along the line II-II illustrated in FIG. 1. FIG. 3 is a cross-sectional diagram taken along the line III-III illustrated in FIG. 1. Each diagram defines an X-axis and a Y-axis that are horizontally oriented and perpendicular to each other. Each diagram also defines a Z-axis perpendicular to the X-axis and the Y-axis. A direction along the Z-axis is defined as a vertical direction. The arrows of the X-axis, the Y-axis, and the Z-axis are assumed to point to a positive direction, while a direction opposite to the positive direction is supposed to be a negative direction.

A breaker 50 includes a tank 1, a fixed contact 2, a movable contact 3, and an operation device 4. The tank 1 includes a cylinder-shaped cylindrical body 11 with its central axis extending in a direction parallel to the Z-axis. The tank 1 includes a bottom lid 12 that closes the bottom face of the cylindrical body 11. The tank 1 includes a top lid 13 that closes the top face of the cylindrical body 11. The cylindrical body 11 is formed with a branch port 11a that is opened toward the horizontal direction. A separate tank (not illustrated) is connected to the branch port 11a. There is a hermetically-enclosed space inside the tank 1. The tank 1 is filled with insulating gas having electrical insulating properties and arc-extinguishing properties, such as sulfur hexafluoride ($SF_6$) gas.

Inside the tank 1, three fixed contacts 2 are provided. In the following descriptions, the three fixed contacts 2 may be respectively referred to as "first fixed contact 2a", "second fixed contact 2b", and "third fixed contact 2c" to be distinguished from each other. The three fixed contacts 2 may also be simply referred to as "fixed contact 2" without being distinguished from each other.

Inside the tank 1, three movable contacts 3 are provided. In the following descriptions, the three movable contacts 3 may be respectively referred to as "first movable contact 3a", "second movable contact 3b", and "third movable contact 3c" to be distinguished from each other. The three movable contacts 3 may also be simply referred to as "movable contact 3" without being distinguished from each other.

The movable contact 3 is movable in a direction parallel to the Z-axis inside the tank 1. The movable contact 3 moves in the direction parallel to the Z-axis so as to move between a position to come out of contact with the fixed contact 2 and a position to come into contact with the fixed contact 2. More specifically, the first movable contact 3a moves between a position to come out of contact with the first fixed contact 2a and a position to come into contact with the first fixed contact 2a. The second movable contact 3b moves between a position to come out of contact with the second fixed contact 2b and a position to come into contact with the second fixed contact 2b. The third movable contact 3c moves between a position to come out of contact with the third fixed contact 2c and a position to come into contact with the third fixed contact 2c.

Conductors 5 and 6 are connected with the fixed contact 2 and the movable contact 3, respectively, and pass through the branch port 11a. When the movable contact 3 comes into contact with the fixed contact 2, the conductor 5 and 6 are electrically connected to each other so that the power supply is brought into a power-on state. When the movable contact 3 moves away from the fixed contact 2, the conductors 5 and 6 are disconnected from each other so that the power supply is brought into a power-off state.

The fixed contact 2 is surrounded by an arc-extinguishing chamber 7. Although detailed descriptions of the configuration of the arc-extinguishing chamber 7 are omitted, inside the arc-extinguishing chamber 7, insulating gas within the tank 1 is sprayed on an arc generated between the movable contact 3 and the fixed contact 2 immediately before the movable contact 3 comes into contact with the fixed contact 2, in order to extinguish the arc. The fixed contact 2 is fixed to the inside of the tank 1 through the arc-extinguishing chamber 7 and an insulating support body 8.

Inside the tank 1, a support plate 15 is provided and opposed to the top lid 13. The support plate 15 is fixed to the top lid 13 by a support bar 14 extending from the top lid 13. The movable contact 3 is supported by the support plate 15. An insulating support body 16 is provided between the movable contact 3 and the support plate 15.

Outside the tank 1, three operation devices 4 are provided above the top lid 13. In the following descriptions, the three operation devices 4 may be respectively referred to as "first operation device 4a", "second operation device 4b", and "third operation device 4c" to be distinguished from each other. The three operation devices 4 may also be simply referred to as "operation device 4" without being distinguished from each other.

The first operation device 4a moves the first movable contact 3a. The second operation device 4b moves the second movable contact 3b. The third operation device 4c moves the third movable contact 3c. That is, in the breaker 50, a single operation device 4 is provided for a single movable contact 3.

The operation device 4 includes an interlocking portion 41 that moves back and forth in a vertical direction along the Z-axis. The interlocking portion 41 passes through the top lid 13 and is inserted into the tank 1. The interlocking portion 41 is connected with the movable contact 3 through a connection member 17. In conjunction with movement of the interlocking portion 41, the movable contact 3 also moves. In the following descriptions, the interlocking portions 41 may be respectively referred to as "first interlocking portion 41a" included in the first operation device 4a, "second interlocking portion 41b" included in the second operation device 4b, and "third interlocking portion 41c" included in the third operation device 4c to be distinguished from each other. The interlocking portions 41 may also be simply referred to as "interlocking portion 41" without being distinguished from each other. The connection member 17 is rotatably connected at one end 17a with a support-point portion 18. The connection member 17 rotates about a connection point with the support-point portion 18 as the interlocking portion 41 moves. The support-point portion 18 is fixed to the support plate 15.

The operation device 4 includes a main body 42 provided with a driving mechanism that moves the interlocking portion 41. Although detailed descriptions of the configuration of the driving mechanism are omitted, the driving mechanism includes a lever, a cam, and a latch mechanism which are intended for transmitting energy stored in a torsion bar described later to the interlocking portion 41, and also includes an electric motor intended for storing energy in the torsion bar.

In the following descriptions, the main bodies 42 may be respectively referred to as "first main body 42a" included in the first operation device 4a, "second main body 42b" included in the second operation device 4b, and "third main body 42c" included in the third operation device 4c to be distinguished from each other. The main bodies 42 may also be simply referred to as "main body 42" without being distinguished from each other.

The operation device 4 includes a torsion bar 43 extending from the main body 42. Each operation device 4 is provided with two torsion bars 43 including a power-on torsion bar 431 and a power-off torsion bar 432. In the following descriptions, the torsion bars 43 may be respectively referred to as "first torsion bar 43a" included in the first operation device 4a, "second torsion bar 43b" included in the second operation device 4b, and "third torsion bar 43c" included in the third operation device 4c to be distinguished from each other. The torsion bars 43 may also be simply referred to as "torsion bar 43" without being distinguished from each other.

Figure 4:
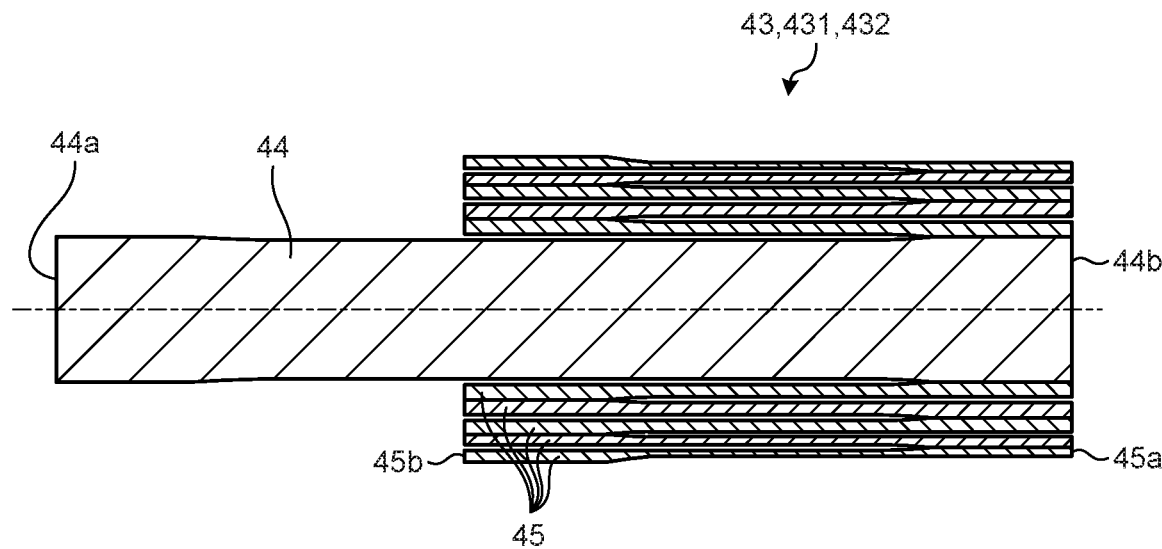
FIG. 4 is a cross-sectional diagram illustrating a schematic configuration of a torsion bar in the embodiment.

FIG. 4 is a cross-sectional diagram illustrating a schematic configuration of the torsion bar in the embodiment. The power-on torsion bar 431 and the power-off torsion bar 432 are identical in configuration. The torsion bar 43 is constituted by a solid rod-shaped solid bar 44 and a plurality of cylindrical hollow bars 45 surrounding the circumference of the solid bar 44 and located coaxially with the solid bar 44.

One end 44a of the solid bar 44 is a portion located on the side of the main body 42. The lever and the cam in the driving mechanism (not illustrated) provided in the main body 42 are connected with the one end 44a of the solid bar 44. The one end 44a of the solid bar 44 serves as a rotatable free end. The other end 44b of the solid bar 44 is connected on its outer circumferential surface with the hollow bar 45 provided on the outer circumferential side of the solid bar 44.

The hollow bars 45, except the hollow bar 45 located on the outermost side of the solid bar 44, are connected at one end portion with the solid bar 44 or the hollow bar 45 provided on the inner circumferential side, while being connected at the other end portion opposite to the one end portion with the hollow bar 45 provided on the outer circumferential side. The hollow bar 45 located on the outermost side is connected at one end 45a with the hollow bar 45 provided on the inner side, while the other end 45b opposite to the one end 45a serves as a fixed end fixed to the main body 42. In the torsion bar 43 configured with a folding structure in which the hollow bars 45 are folded at the connected end portion as described above, the one end 44a of the solid bar 44 is rotated about the central axis, and consequently the solid bar 44 and the hollow bars 45 are twisted in their entirety because the other end 45b of the hollow bar 45 provided on the outermost side serves as a fixed end. The torsion bar 43 stores therein energy to be used for restoring from the twisted state.

The power-on torsion bar 431 is twisted by an electric motor (not illustrated). Restoring of the power-on torsion bar 431 from the twisted state is restricted by the latch mechanism. When the restriction is released, the one end 44a of the solid bar 44 of the power-on torsion bar 431 rotates in a restoring direction. The rotation of the one end 44a is converted to movement of the interlocking portion 41 of the operation device 4 through the lever or the like in the driving mechanism, so that the movable contact 3 moves to the position to come into contact with the fixed contact 2. The power-on operation is thus completed.

When the one end 44a of the solid bar 44 of the power-on torsion bar 431 rotates in a restoring direction, the one end 44a of the solid bar 44 of the power-off torsion bar 432 is rotated by action of the cam in the driving mechanism. Restoring of the power-off torsion bar 432 from the twisted state is restricted by the latch mechanism. When the restriction is released, the one end 44a of the solid bar 44 of the power-off torsion bar 432 rotates in a restoring direction. The rotation of the one end 44a is converted to movement of the interlocking portion 41 of the operation device 4 through the lever or the like in the driving mechanism, so that the movable contact 3 moves to the position to come out of contact with the fixed contact 2. The power-off operation is thus completed. For example, a signal for releasing the restriction by the latch mechanism is transmitted simultaneously to the three operation devices 4 so that the power-on operation and the power-off operation can be performed on three phases simultaneously.

FIG. 1 illustrates the positions of the fixed contacts 2 and the movable contacts 3 by the dotted circles. As illustrated in FIG. 1, as viewed along the Z-axis that is a movement direction of the movable contacts 3, each of the fixed contacts 2 and the movable contacts 3 is positioned at an apex of a triangular shape. Similarly, each of the operation devices 4 is positioned at an apex of a triangular shape.

More specifically, the first operation device 4a and the third operation device 4c are located side by side along the X-axis direction as a first direction. The second operation device 4b is located at a position displaced relative to the first operation device 4a and the third operation device 4c toward one side that is the positive-direction side in a direction along the Y-axis as a second direction perpendicular to the direction along the X-axis, the position being between the first operation device 4a and the third operation device 4c in the direction along the X-axis.

The first torsion bar 43a, the second torsion bar 43b, and the third torsion bar 43c extend toward the other side in the direction along the Y-axis that is toward the negative-direction side. The second torsion bar 43b passes between the first operation device 4a and the third operation device 4c.

In the breaker 50 configured as described above, a single operation device 4 moves a single movable contact 3. Thus, as compared to a three-phase simultaneous operation device in which a single operation device moves three movable contacts, the torsion bar 43 needs a smaller amount of energy to be stored. Therefore, the torsion bar 43 according to the embodiment is shorter than a torsion bar included in the three-phase simultaneous operation device. Due to this configuration, the dimension of a protrusion of the operation device 4 including the torsion bar 43 from the tank 1 can be reduced, as viewed along the Z-axis. In the embodiment, the operation device 4 hardly protrudes from the tank 1 in the direction along the X-axis, and the dimension of a protrusion of the operation device 4 from the tank 1 in the direction along the Y-axis can be reduced. Therefore, a decrease in design flexibility for the gas-insulated switchgear including the breaker 50, caused by securing a space for the torsion bar 43, can be suppressed.

The torsion bar 43 is configured with a folding structure in which the solid bar 44 and the hollow bars 45 are combined. Thus, the length of the torsion bar 43 can further be reduced as compared to a torsion bar that is not configured with a folding structure. In other words, the torsion bar 43 can store therein a greater amount of energy despite its reduced length. Assuming that a single torsion bar 43 stores therein 50% of the energy of a torsion bar included in a three-phase simultaneous operation device, the breaker 50 including three operation devices 4 is capable of moving the movable contacts 3 using 50%×3=150% energy, that is, 1.5 times greater than the energy of a breaker including the three-phase simultaneous operation device. Therefore, the breaker 50 is capable of moving the movable contacts 3 at a higher speed than the breaker including the three-phase simultaneous operation device, while reducing the length of the torsion bar 43. Accordingly, duration of an arc generated between the fixed contact 2 and the movable contact 3 can be reduced. The torsion bar 43 is not limited to the configuration using a plurality of hollow bars 45 located coaxially with each other, but may be constituted by, for example, a single solid bar.

Figure 5:
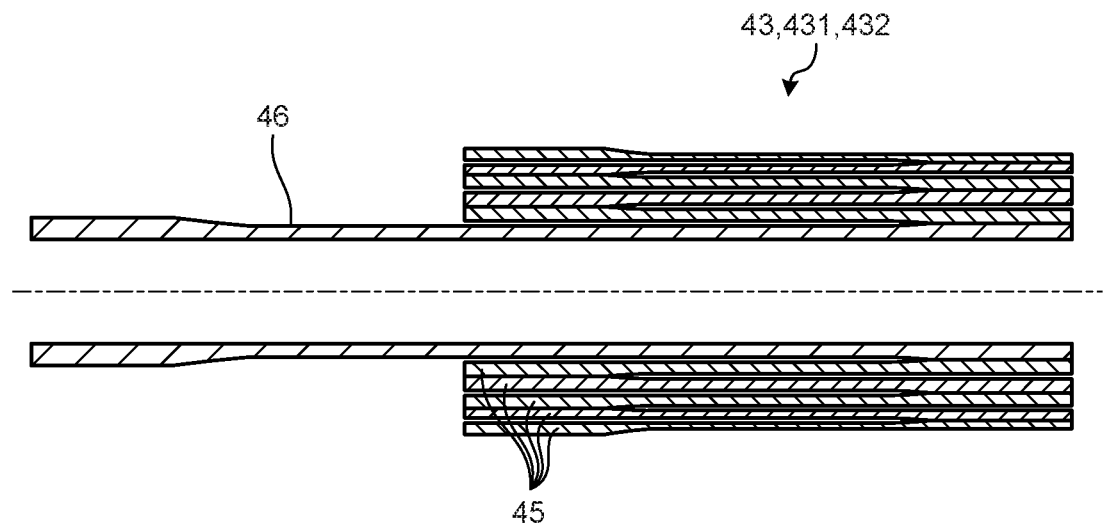
FIG. 5 is a cross-sectional diagram illustrating another example of the torsion bar in the embodiment.

FIG. 5 is a cross-sectional diagram illustrating another example of the torsion bar in the embodiment. As illustrated in FIG. 5, it is allowable that the torsion bar 43 is formed by providing a hollow bar 46 on the innermost side.

Figure 6:
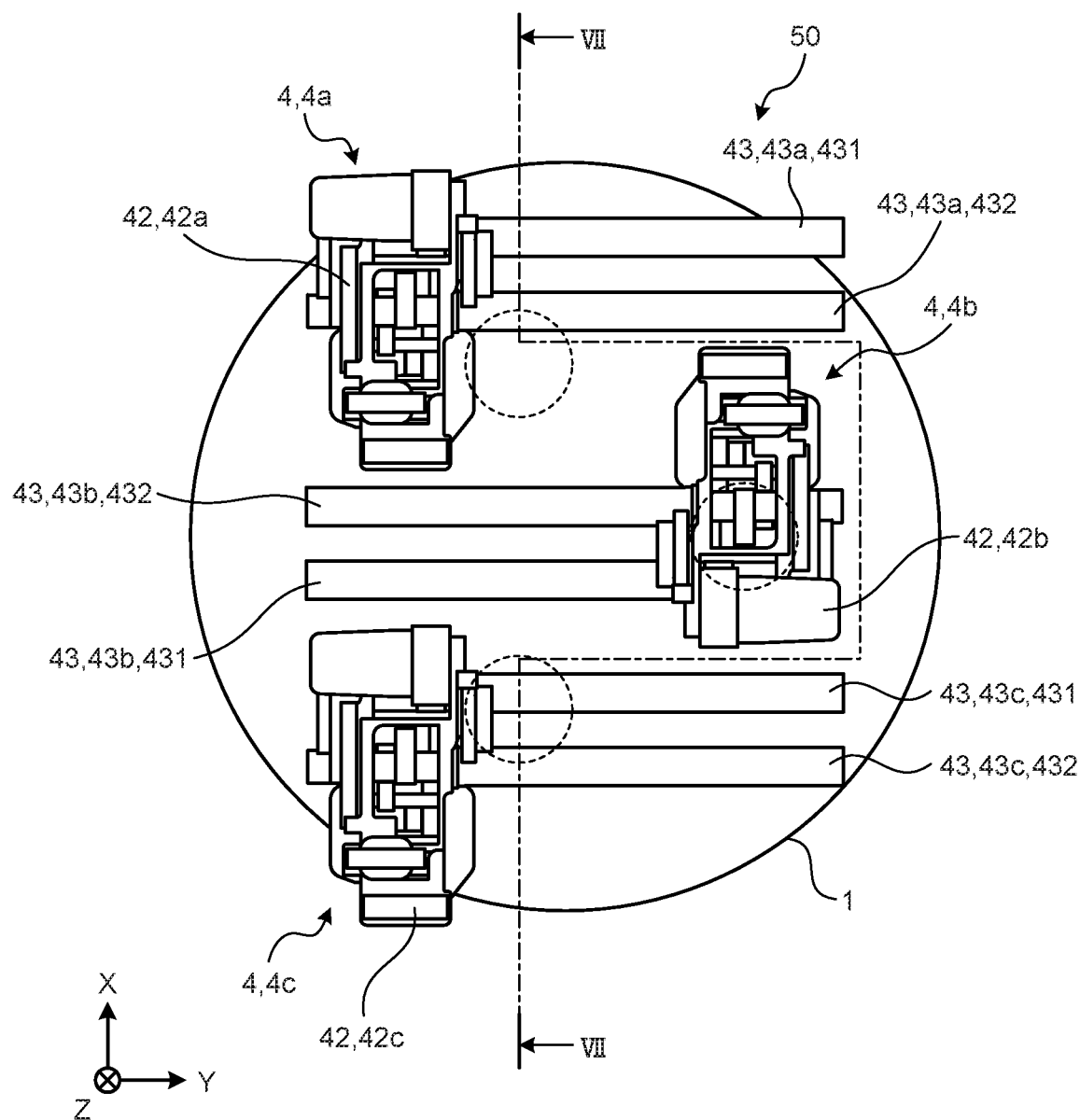
FIG. 6 is a plan view illustrating a modification of the breaker according to the embodiment.
Figure 7:
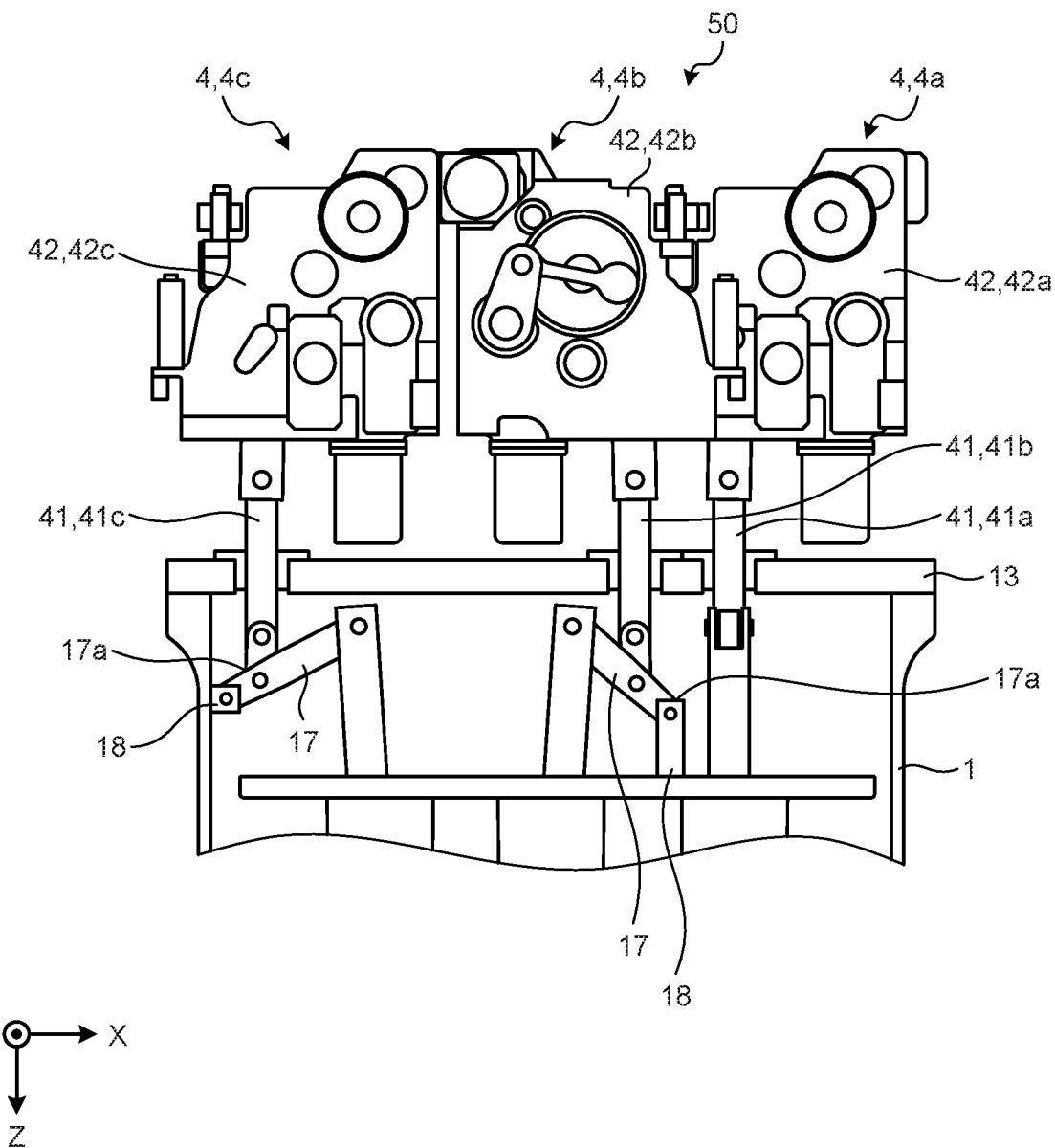
FIG. 7 is a cross-sectional diagram taken along the line VII-VII illustrated in FIG. 6.

FIG. 6 is a plan view illustrating a modification of the breaker according to the embodiment. FIG. 7 is a cross-sectional diagram taken along the line VII-VII illustrated in FIG. 6. In the breaker 50 according to the modification, the first torsion bar 43a and the third torsion bar 43c extend toward one side in a direction along the Y-axis that is toward the positive direction. The second torsion bar 43b extends toward the other side in the direction along the Y-axis that is toward the negative direction. An end portion of the first operation device 4a and the third operation device 4c on the negative-direction side in the direction along the Y-axis is located in alignment with an end portion of the second torsion bar 43b on the negative-direction side in the direction along the Y-axis. With this layout, the first operation device 4a and the third operation device 4c are displaced toward the negative-direction side in the direction along the Y-axis, as compared to the example illustrated in FIG. 1.

Even when the first operation device 4a and the third operation device 4c are displaced, by fixing the support-point portion 18 of the connection member 17 to the tank 1, or adjusting the length of the connection member 17 as illustrated in FIG. 7, the movable contact 3 can still be configured to move as the interlocking portion 41 moves.

In the arrangement of the operation devices 4 illustrated in FIG. 6, as viewed along the Z-axis, the dimension of a protrusion of the operation devices 4 from the tank 1 in a direction along the Y-axis can be reduced as compared to the example illustrated in FIG. 1. This can further suppress a decrease in design flexibility for the gas-insulated switchgear including the breaker 50. It is allowable that the power-on torsion bar 431 and the power-off torsion bar 432 are configured by combination of the torsion bar 43 exemplified in FIG. 4 and the torsion bar 43 exemplified in FIG. 5.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1 tank, 2 fixed contact, 2a first fixed contact, 2b second fixed contact, 2c third fixed contact, movable contact, 3a first movable contact, 3b second movable contact, 3c third movable contact, 4 operation device, 4a first operation device, 4b second operation device, 4c third operation device, 5, 6 conductor, 7 arc-extinguishing chamber, 8 support body, 11 cylindrical body, 11a branch port, 12 bottom lid, 13 top lid, 14 support bar, 15 support plate, 16 support body, 17 connection member, 17a one end, 18 support-point portion, 41 interlocking portion, 41a first interlocking portion, 41b second interlocking portion, 41c third interlocking portion, 42 main body, 42a first main body, 42b second main body, 42c third main body, 43 torsion bar, 43a first torsion bar, 43b second torsion bar, 43c third torsion bar, 44 solid bar, 44a one end, 44b the other end, 45, 46 hollow bar, 45a one end, 45b the other end, breaker, 431 power-on torsion bar, 432 power-off torsion bar.

The invention claimed is:
1. A breaker comprising:
a tank;
a first fixed contact provided inside the tank;
a second fixed contact provided inside the tank;
a third fixed contact provided inside the tank;
a first movable contact that is provided inside the tank and is movable between a position to come into contact with the first fixed contact and a position to come out of contact with the first fixed contact;
a second movable contact that is provided inside the tank and is movable between a position to come into contact with the second fixed contact and a position to come out of contact with the second fixed contact;
a third movable contact that is provided inside the tank and is movable between a position to come into contact with the third fixed contact and a position to come out of contact with the third fixed contact;
a first operation device provided outside the tank to move the first movable contact;
a second operation device provided outside the tank to move the second movable contact; and
a third operation device provided outside the tank to move the third movable contact, wherein
the first operation device includes:
a first main body having a first interlocking portion that is inserted into the tank and connected with the first movable contact and moves in conjunction with the first movable contact; and
a first torsion bar having a rod shape extending from the first main body, and serving as a driving source to move the first interlocking portion and thus to move the first movable contact, wherein
the second operation device includes:
a second main body having a second interlocking portion that is inserted into the tank and connected with the second movable contact and moves in conjunction with the second movable contact; and
a second torsion bar having a rod shape extending from the second main body, and serving as a driving source to move the second interlocking portion and thus to move the second movable contact, wherein
the third operation device includes:
a third main body having a third interlocking portion that is inserted into the tank and connected with the third movable contact and moves in conjunction with the third movable contact; and
a third torsion bar having a rod shape extending from the third main body, and serving as a driving source to move the third interlocking portion and thus to move the third movable contact, wherein
as viewed along a movement direction of the first movable contact,
the first operation device and the third operation device are located side by side along a first direction perpendicular to the movement direction, and the second operation device is located at a position displaced relative to the first operation device and the third operation device toward one side along a second direction perpendicular to the first direction, the position being between the first operation device and the third operation device in the first direction, and
the first torsion bar, the second torsion bar, and the third torsion bar extend toward the other side along the second direction.

2. The breaker according to claim 1, wherein at least one of the first torsion bar and the second torsion bar is constituted by a solid rod-shaped solid bar and a cylindrical hollow bar surrounding a circumference of the solid bar and located coaxially with the solid bar.

3. The breaker according to claim 1, wherein at least one of the first torsion bar and the second torsion bar is constituted by a plurality of cylindrical hollow bars located coaxially with each other.

4. A breaker comprising:
a tank;
a first fixed contact provided inside the tank;
a second fixed contact provided inside the tank;
a third fixed contact provided inside the tank;
a first movable contact that is provided inside the tank and is movable between a position to come into contact with the first fixed contact and a position to come out of contact with the first fixed contact;

a second movable contact that is provided inside the tank and is movable between a position to come into contact with the second fixed contact and a position to come out of contact with the second fixed contact;

a third movable contact that is provided inside the tank and is movable between a position to come into contact with the third fixed contact and a position to come out of contact with the third fixed contact;

a first operation device provided outside the tank to move the first movable contact;

a second operation device provided outside the tank to move the second movable contact; and a third operation device provided outside the tank to move the third movable contact, wherein the first operation device includes:
- a first main body having a first interlocking portion that is inserted into the tank and connected with the first movable contact and moves in conjunction with the first movable contact; and
- a first torsion bar having a rod shape extending from the first main body, and serving as a driving source to move the first interlocking portion and thus to move the first movable contact, wherein the second operation device includes:
- a second main body having a second interlocking portion that is inserted into the tank and connected with the second movable contact and moves in conjunction with the second movable contact; and
- a second torsion bar having a rod shape extending from the second main body, and serving as a driving source to move the second interlocking portion and thus to move the second movable contact, wherein the third operation device includes:
- a third main body having a third interlocking portion that is inserted into the tank and connected with the third movable contact and moves in conjunction with the third movable contact; and
- a third torsion bar having a rod shape extending from the third main body, and serving as a driving source to move the third interlocking portion and thus to move the third movable contact, wherein as viewed along a movement direction of the first movable contact, the first operation device and the third operation device are located side by side along a first direction perpendicular to the movement direction, and the second operation device is located at a position displaced relative to the first operation device and the third operation device toward one side along a second direction perpendicular to the first direction, the position being between the first operation device and the third operation device in the first direction, the first torsion bar and the third torsion bar extend toward one side along the second direction, and the second torsion bar extends toward the other side along the second direction.

5. The breaker according to claim 4, wherein at least one of the first torsion bar and the second torsion bar is constituted by a solid rod-shaped solid bar and a cylindrical hollow bar surrounding a circumference of the solid bar and located coaxially with the solid bar.

6. The breaker according to claim 4, wherein at least one of the first torsion bar and the second torsion bar is constituted by a plurality of cylindrical hollow bars located coaxially with each other.

* * * * *